United States Patent
Kim et al.

(10) Patent No.: US 10,022,684 B2
(45) Date of Patent: Jul. 17, 2018

(54) IMPELLER MIXER OF ELECTRODE SLURRY

(71) Applicant: LG CHEM, LTD., Seoul (KR)

(72) Inventors: Hyuk Su Kim, Daejeon (KR); Dae Geun Ku, Daejeon (KR); Jun Woo Huh, Daejeon (KR); Hyang Mok Lee, Daejeon (KR); Chang Bum Ahn, Daejeon (KR)

(73) Assignee: LG CHEM, LTD., Seoul (KR)

( * ) Notice: Subject to any disclaimer, the term of this patent is extended or adjusted under 35 U.S.C. 154(b) by 358 days.

(21) Appl. No.: 14/773,627

(22) PCT Filed: Aug. 18, 2014

(86) PCT No.: PCT/KR2014/007636
§ 371 (c)(1),
(2) Date: Sep. 8, 2015

(87) PCT Pub. No.: WO2015/030406
PCT Pub. Date: Mar. 5, 2015

(65) Prior Publication Data
US 2016/0023173 A1      Jan. 28, 2016

(30) Foreign Application Priority Data
Aug. 30, 2013   (KR) .................. 10-2013-0103628

(51) Int. Cl.
*B01F 7/20*      (2006.01)
*B01F 7/26*      (2006.01)
(Continued)

(52) U.S. Cl.
CPC .............. *B01F 7/22* (2013.01); *B01F 3/1221* (2013.01); *B01F 7/00641* (2013.01);
(Continued)

(58) Field of Classification Search
CPC ...... B01F 7/22; B01F 7/00641; B01F 3/1221; B01F 7/162; H01M 4/04; H01M 4/0404
(Continued)

(56) References Cited

U.S. PATENT DOCUMENTS

| | | | | |
|---|---|---|---|---|
| 3,024,010 A | * | 3/1962 | Sperling | ................. B01F 7/162 241/282.1 |
| 3,503,846 A | * | 3/1970 | Nardi | ........................ B01F 5/16 162/236 |

(Continued)

FOREIGN PATENT DOCUMENTS

| | | |
|---|---|---|
| DE | 2529673 A1 * | 1/1977 |
| JP | 2006-272139 A | 10/2006 |

(Continued)

OTHER PUBLICATIONS

International Search Report, issued in PCT/KR2014/007636, dated Nov. 21, 2014.

*Primary Examiner* — Charles E Cooley
(74) *Attorney, Agent, or Firm* — Birch, Stewart, Kolasch & Birch, LLP

(57) ABSTRACT

An impeller mixer of electrode slurry includes a container (100) filled with raw materials of electrode slurry, impellers (110) have different shapes from each other and are multi-layered, the impellers being rotatably provided in the container (100) and configured to mix the raw materials of electrode slurry, and a driving part (120) disposed on a bottom portion of the container (100) and coupled to the impellers (110) through a coupling shaft to rotate the impeller, wherein the coupling shaft is disposed above the driving part. Therefore, multi-layered impellers (11) rotating at a high speed efficiently disperse raw materials of electrode slurry in a short time and also allow the raw materials to be uniformly mixed, resulting in an increase in work efficiency.

6 Claims, 6 Drawing Sheets

(51) Int. Cl.
*B01F 7/22* (2006.01)
*B01F 7/16* (2006.01)
*B01F 7/00* (2006.01)
*B01F 3/12* (2006.01)
*H01M 4/04* (2006.01)

(52) U.S. Cl.
CPC ............... B01F 7/162 (2013.01); H01M 4/04 (2013.01); H01M 4/0404 (2013.01)

(58) Field of Classification Search
USPC .................................. 366/314, 329.1, 329.2
See application file for complete search history.

(56) References Cited

U.S. PATENT DOCUMENTS

| | | | | |
|---|---|---|---|---|
| 4,518,262 A | * | 5/1985 | Bornemann | ............ B01F 7/162 366/144 |
| 4,983,046 A | * | 1/1991 | Murata | ............... B01F 7/00008 241/199.12 |
| 5,356,215 A | * | 10/1994 | Inoue | .................. B01F 7/00141 366/293 |
| 5,358,328 A | * | 10/1994 | Inoue | .................. B01F 7/00141 366/266 |
| 5,972,695 A | * | 10/1999 | Murofushi | .......... B01F 7/00241 366/295 |
| 8,178,009 B2 | | 5/2012 | Watanabe | |
| 2012/0195159 A1 | | 8/2012 | Kitayoshi et al. | |
| 2016/0023173 A1 | * | 1/2016 | Kim | .................... B01F 7/00641 429/209 |

FOREIGN PATENT DOCUMENTS

| | | |
|---|---|---|
| JP | 2011-83672 A | 4/2011 |
| JP | 2013-93140 A | 5/2013 |
| KR | 10-2012-0068383 A | 6/2012 |
| TW | I470861 B | 1/2015 |
| WO | WO 2008/090427 A1 | 7/2008 |

* cited by examiner

IMPELLER MIXER OF ELECTRODE SLURRY

TECHNICAL FIELD

The present invention relates to an impeller mixer of electrode slurry, and more particularly, to an impeller mixer of electrode slurry which efficiently disperses raw materials of electrode slurry to allow the raw materials to be uniformly mixed.

BACKGROUND ART

In general, a mixer is an apparatus for dispersing, agitating, or mixing contents input into a container, and is capable of uniformly mixing various contents including food, medicine, and electronic materials by using a device installed on a motor, thereby being widely used for household and industrial fields.

Such a mixer includes a motor converting electric energy into mechanical energy, and an impeller performing rotary motion by the converted mechanical energy. The impeller has blades contacting contents, and thus can mix contents such as liquid, slurry, and solid by controlling the speed of rotary motion.

However, as illustrated in FIG. 1, a related art impeller mixer includes one or two high-speed rotating impellers 10 which are smaller in size than a container, to thereby reduce dispersion efficiency of raw materials. Moreover, it is difficult to disperse raw materials when the raw materials are input at once, so that the raw materials should be divided and input in sequence, which requires a long processing time.

DISCLOSURE

Technical Problem

An aspect of the present invention is to provide an impeller mixer of electrode slurry for solving above mentioned shortcomings, and particularly, to provide an impeller mixer of electrode slurry capable of efficiently dispersing raw materials of electrode slurry to allow the raw materials to be uniformly mixed.

Technical Solution

According to an aspect of the present invention, there is provided an impeller mixer of electrode slurry including: a container filled with raw materials of electrode slurry; impellers which have different shapes from each other and are multi-layered, the impellers being rotatably provided in the container and configured to mix the raw materials of electrode slurry; and a driving part disposed on a bottom portion of the container and coupled to the impellers through a coupling shaft to rotate the impeller, wherein the coupling shaft is disposed above the driving part.

The impeller may include a first impeller, a second impeller, and a third impeller, wherein the first impeller is disposed adjacent to a bottom surface of the container, the second impeller is vertically spaced a predetermined distance from the first impeller, and the third impeller is vertically spaced another predetermined distance from the second.

The first impeller may include bars arranged on an outer circumferential surface of a disk at intervals of a predetermined angle to move the raw materials of electrode slurry from bottom to top.

The second impeller may include protrusions disposed on top and bottom surfaces of a disk to mix the raw material of electrode slurry.

The third impeller may include bars which are arranged on an outer circumferential surface of a disk at intervals of a predetermined angle and of which ends diagonally protrude in an upward direction, so that the raw material of electrode slurry move downwardly.

The first impeller may be horizontally longer than the second impeller, and the second impeller may be horizontally longer than the third impeller.

The raw material of electrode slurry is a mixture in which an electrode active material, a conductive material, and a binder are mixed in a solvent.

An electrode for a secondary battery coated with electrode slurry manufactured by the impeller mixer of electrode slurry according to any one of claims 1 to 7.

Advantageous Effects

As described above, multi-layered impellers rotating at a high speed efficiently disperse raw materials of electrode slurry in a short time and also allow the raw materials to be uniformly mixed, resulting in an increase in work efficiency.

MODE FOR INVENTION

Hereinafter, exemplary embodiments will be described in detail with reference to the accompanying drawings.

As illustrated in FIGS. 2 to 6, an impeller mixer of electrode slurry of the present invention includes a container 100 filled with raw materials, an impeller 110 which is multi-layered and rotatably provided in the container 100, and a driving part 120 disposed on a bottom portion of the container 100 to rotate the impeller 110.

Figure 1:
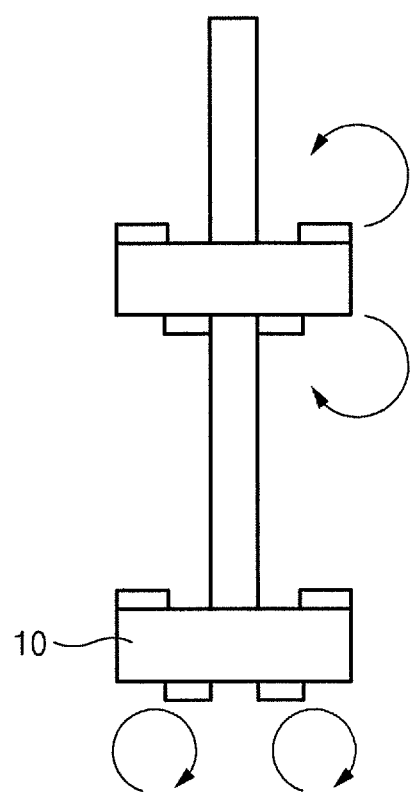
FIG. 1 is a cross-sectional view of a related art impeller mixer.
Figure 2:
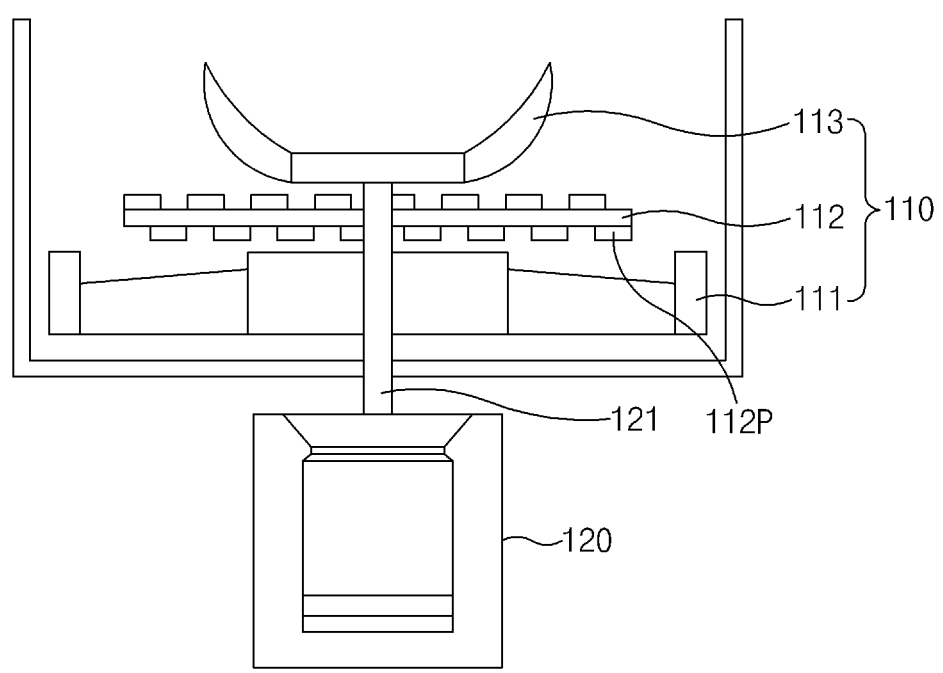
FIG. 2 is a cross-sectional view illustrating an impeller mixer of electrode slurry according to an embodiment of the present invention.

As illustrated in FIG. 2, the container 100 has a space therein, so as to be filled with raw materials of electrode slurry.

The container 100 may have a cylindrical shape to maintain a constant clearance between the impeller 110 and an inner wall of the container 100 when the impeller 110 rotates.

The impeller 110 is rotatably provided in the container 100 to disperse and mix raw materials of electrode slurry.

Here, the impeller 110 is composed of a first impeller 111, a second impeller 112, and a third impeller 113, which have different shapes from one another and are multi-layered vertically.

The first impeller 111 may be disposed adjacent to a bottom surface of the container 100, the second impeller 112 may be vertically spaced a predetermined distance from the first impeller 111, and the third impeller 113 may be vertically spaced another predetermined distance from the second impeller 112.

Figure 3:
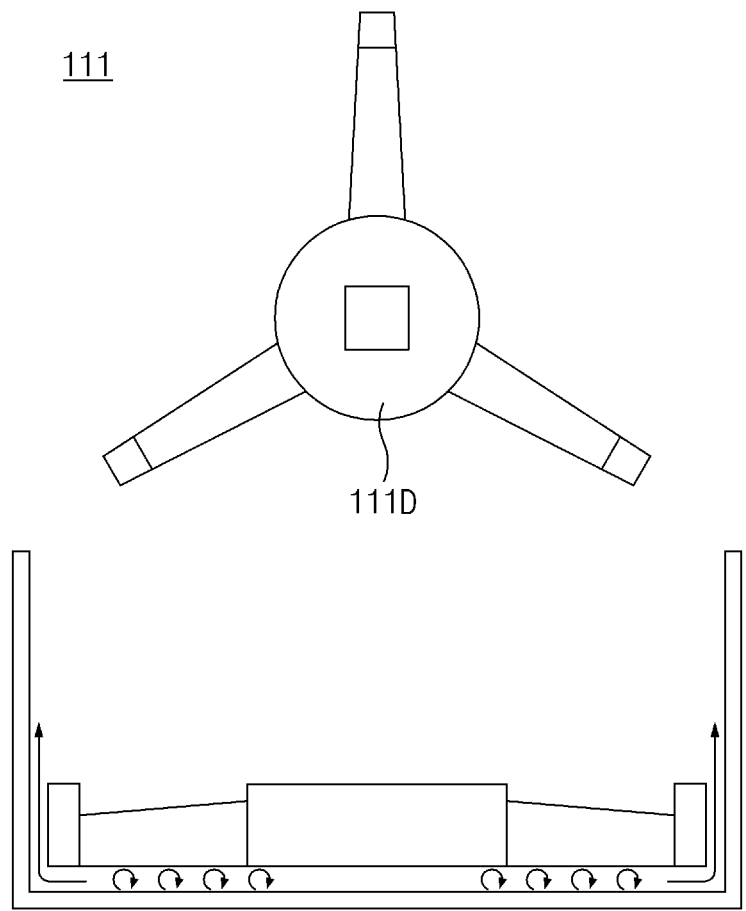
FIG. 3 illustrates a first impeller in the impeller mixer of electrode slurry according to an embodiment of the present invention.
Figure 6:
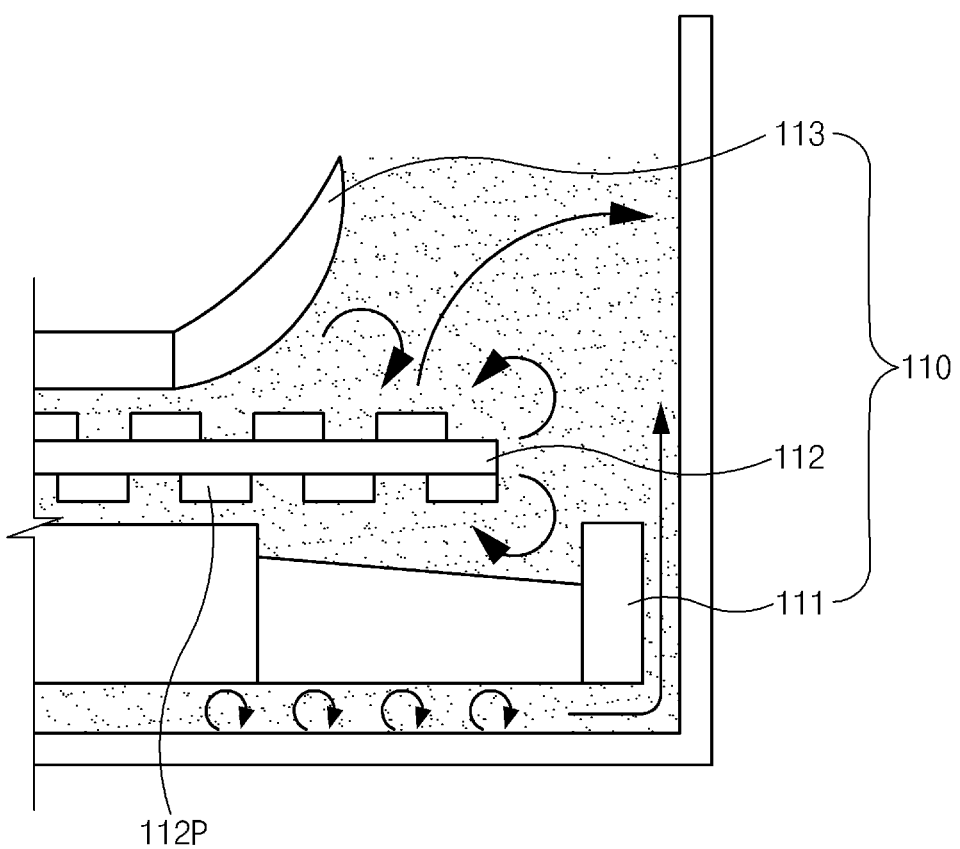
FIG. 6 illustrates that raw materials of electrode slurry are moved by the impeller in the impeller mixer of electrode slurry according to an embodiment of the present invention.

As illustrated in FIGS. 2 and 3, the first impeller 111 has the shape of a disk 111D, and includes bars arranged on an outer circumferential surface of the disk 111D at intervals of a predetermined angle, so that raw materials of electrode slurry move upward along the inner wall of the container 100 when the impeller 110 rotates, as illustrated in FIGS. 3 and 6.

Here, the first impeller 111 may have a total of three bars at intervals of 120 degrees.

Figure 5:
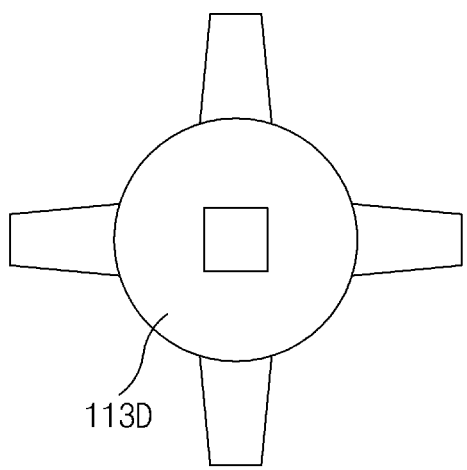
FIG. 5 illustrates a third impeller in the impeller mixer of electrode slurry according to an embodiment of the present invention.
Figure 5:
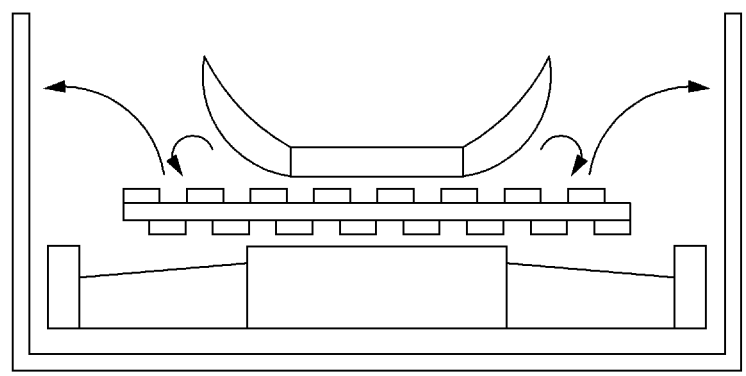

As illustrated in FIGS. 2 and 5, the third impeller 113 has the shape of a disk 113D, and includes bars which are arranged on an outer circumferential surface of the disk 113D at intervals of a predetermined angle and of which ends diagonally protrude in an upward direction. Thus, as illustrated in FIGS. 5 and 6, the raw materials of electrode slurry moved upwardly by the first impeller 111 are moved downwardly due to a slope of the end of the third impeller 113 when the impeller 110 rotates.

Here, the third impeller 113 may have four bars arranged at intervals of 90 degree.

Figure 4:
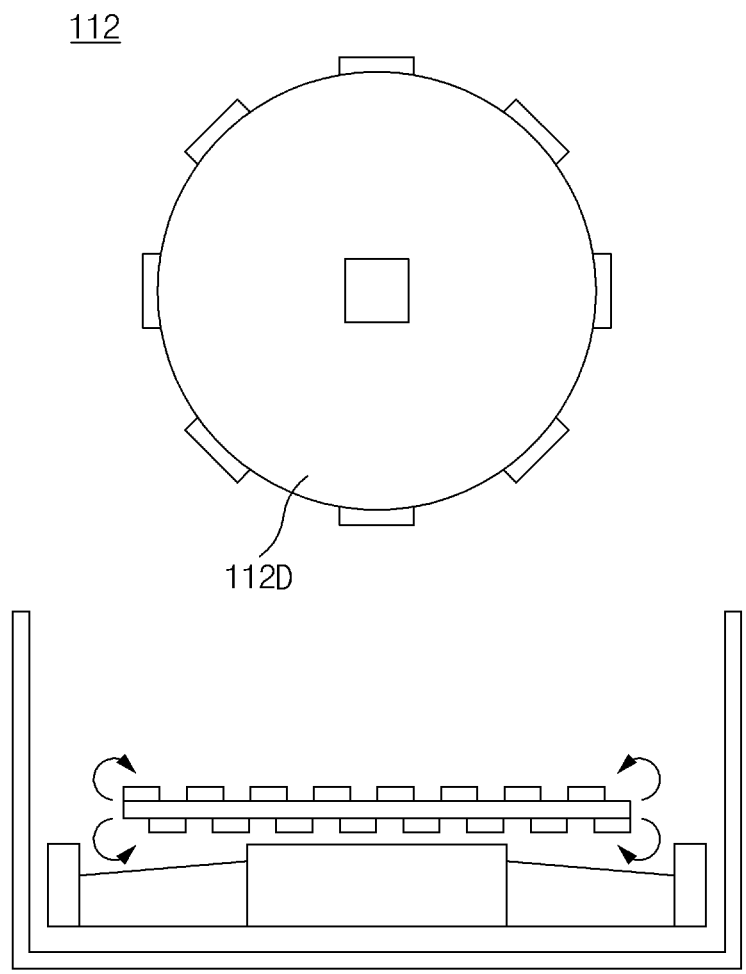
FIG. 4 illustrates a second impeller in the impeller mixer of electrode slurry according to an embodiment of the present invention.

As illustrated in FIGS. 2 and 4, the second impeller 112 has the shape of a disk 112D, and includes protrusions 112P (see FIG. 6) disposed on top and bottom surfaces of the disk 112D. The second impeller 112 is disposed between the first impeller 111 and the third impeller 113 thereby making it possible to mix the raw materials of electrode slurry moved upwardly by the first impeller 111 and the raw materials moved downwardly by the third impeller 113, as illustrated in FIGS. 4 and 6.

The first impeller 111 is horizontally longer than the second impeller 112 and the second impeller 112 is horizontally longer than the third impeller 113, which enables the raw materials of electrode slurry filled in a bottom portion of the container 100 to be moved upwardly.

The first impeller 111, the second impeller 112, and the third impeller 113 basically have a disk shape as described above, but each may have a different shape depending on the raw materials of electrode slurry.

The driving part 120 configured to rotate the impeller 110 is disposed on the bottom portion of the container 100 to rotate the impeller 110 at a high speed, and has a coupling shaft 121 thereabove.

Here, the coupling shaft 121 of the driving part 120 passes through the bottom portion of the container 100 and is coupled to the impeller 110 to allow the impeller 110 to be rotated by an operation of the driving part 120.

Like this, according to the present invention, the multi-layered impeller 110 is rotated by the driving part 120 and raw materials of electrode slurry filled in the container 100 are efficiently dispersed upwardly and downwardly by the rotation of the impeller 110 including the first impeller 111, the second impeller 112, and the third impeller 113, so that the raw materials can be uniformly mixed.

The raw material of electrode slurry may be a mixture in which an electrode active material, a conductive material, and a binder are mixed in a solvent.

Here, electrode active materials are divided into a cathode active material and an anode active material, and the cathode active material may include, although not limited to, for example, a layered compound such as lithium cobalt oxide ($LiCoO_2$) and lithium nickel oxide ($LiNiO_2$) or a compound substituted with one or more transition metals; a lithium manganese oxide expressed as chemical formula $Li1+yMn_2-yO_4$ (where, y is in the range of 0 to 0.33), $LiMnO_3$, $LiMn2O_3$, and $LiMnO_2$; a lithium copper oxide ($Li_2CuO_2$); a vanadium oxide such as $LiV3O8$, $LiFe3O4$, $V2O5$, $Cu2V2O7$; a Ni site type lithium nickel oxide expressed as chemical formula $LiNi1-yMyO_2$ (where, M is Co, Mn, Al, Cu, Fe, Mg, B or Ga, and y is in the range of 0.01 to 0.3); a lithium manganese composite oxide expressed as chemical formula $LiMn_2-yMyO_2$ (where, M is Co, Ni, Fe, Cr, Zn or Ta, and y is in the range of 0.01 to 0.1) or $Li_2Mn_3MO_8$ (where, M is Fe, Co, Ni, Cu or Zn); $LiMn_2O_4$ in which Li is partially substituted by an alkali earth element ion; a disulfide compound; and $Fe_2(MoO_4)_3$. The anode active material may include, for example, carbon such as non-graphitizable carbon and graphite-based carbon; a metal composite oxide such as $LixFe_2O_3$ ($0 \leq x \leq 1$), $LixWO_2$ ($0 \leq x \leq 1$), and $SnxMe_1-xMe'yOz$ (Me: Mn, Fe, Pb, Ge; Me': Al, B, P, Si, Group 1, Group 2, and Group 3 elements of the Periodic Table, halogen; $0 < x \leq 1$; $1 \leq y \leq 3$; $1 \leq z \leq 8$); lithium metal; lithium alloy; silicon-based alloy; tin-based alloy; a metal oxide such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; a conductive polymer such as polyacetylene; and Li—Co—Ni based materials.

The conductive material is typically added in an amount of 1 to 30% by weight based on a total weight of a mixture containing a cathode active material. The conductive material is not particularly limited as long as it does not induce the battery to be chemically changed and has conductivity. For example, the conductive material may include: graphite such as natural graphite or artificial graphite; carbon black such as carbon black, acetylene black, ketjen black, channel black, furnace black, lamp black, summer black; conductive fibers such as carbon fibers and metallic fibers; metal powder such as carbon fluoride, aluminum, and nickel powder; conductive whiskers such as zinc oxide and potassium titanate; conductive metal oxides such as titanium oxide; and conductive materials such as polyphenylene derivatives.

The binder is a component which assists in binding of an active material and a conductive agent and in binding to a current collector, and is typically added in an amount of 1 to 30% by weight based on a total weight of a mixture containing a cathode active material. Examples of the binder may include polyvinylidene fluoride, polyvinyl alcohol, carboxymethyl cellulose (CMC), starch, hydroxypropyl cellulose, regenerated cellulose, polyvinylpyrrolidone, tetrafluoroethylene, polyethylene, polypropylene, ethylene-propylene-diene terpolymer (EPDM), sulfonated EPDM, styrene butadiene rubber, fluoro rubber, and various copolymers.

As mentioned above, in the present invention, an electrode for a secondary battery may be produced by applying the electrode slurry prepared by use of the impeller mixer of electrode slurry onto the electrode.

Although a preferred embodiment of the present invention has been disclosed, various changes and modifications may be made thereto by one skilled in the art without departing from the scope and spirit of the invention as set forth in the appended claims. It is also understood that the terms used herein are merely descriptive, rather than limiting, and that various changes may be made without departing from the scope and spirit of the invention.

The invention claimed is:

1. An impeller mixer of electrode slurry, comprising:
   a container filled with raw materials of electrode slurry;
   a plurality of impellers which have different shapes from each other and are multi-layered, the impellers being rotatably provided in the container and configured to mix the raw materials of electrode slurry, the impellers including a first impeller, a second impeller, and a third impeller, the first impeller being disposed adjacent to a bottom surface of the container, the second impeller being vertically spaced a predetermined distance above the first impeller, and the third impeller being vertically spaced another predetermined distance above the second impeller, the second impeller being horizontally longer than the third impeller; and a driving part disposed on a bottom portion of the container and coupled to the impellers through a coupling shaft to rotate the impeller, wherein the coupling shaft is disposed above the driving part, wherein the third impeller comprises bars which are arranged on an outer circumferential surface of a disk at intervals of a predetermined angle and of which ends diagonally protrude in an upward direction, so that the raw material of electrode slurry move downwardly.

2. The impeller mixer of electrode slurry of claim 1, wherein the first impeller comprises bars arranged on an outer circumferential surface of a disk at intervals of a predetermined angle to move the raw materials of electrode slurry from bottom to top.

3. The impeller mixer of electrode slurry of claim 1, wherein the second impeller comprises protrusions disposed on top and bottom surfaces of a disk to mix the raw material of electrode slurry.

4. The impeller mixer of electrode slurry of claim 1, wherein the first impeller is horizontally longer than the second impeller.

5. The impeller mixer of electrode slurry of claim 1, wherein the raw material of electrode slurry is a mixture in which an electrode active material, a conductive material, and a binder are mixed in a solvent.

6. The impeller mixer of electrode slurry of claim 1, wherein the plurality of impellers consists of the first impeller, the second impeller, and the third impeller.

* * * * *